(12) United States Patent
Harasin et al.

(10) Patent No.: US 8,188,208 B2
(45) Date of Patent: May 29, 2012

(54) SOLID POLYURETHANE ELASTOMERS WHICH EXHIBIT REDUCED DIMENSIONAL SHRINKAGE

(75) Inventors: Stephen J. Harasin, Morgan, PA (US); William D. Keller, Jr., Arona, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1880 days.

(21) Appl. No.: 11/035,591

(22) Filed: Jan. 13, 2005

(65) Prior Publication Data

US 2006/0155092 A1 Jul. 13, 2006

(51) Int. Cl.
*C08G 18/28* (2006.01)

(52) U.S. Cl. .............. 528/59; 528/61; 528/62; 528/66; 528/68; 528/76; 528/77; 528/85

(58) Field of Classification Search .............. 528/59, 528/61, 62, 66, 68, 76, 77, 85
See application file for complete search history.

(56) References Cited

U.S. PATENT DOCUMENTS

| 4,218,543 A | 8/1980 | Weber et al. ............ 521/51 |
| 4,243,760 A | 1/1981 | McDaniel et al. ............ 521/176 |
| 4,297,444 A | 10/1981 | Gilbert et al. ............ 521/160 |
| 4,440,705 A | 4/1984 | Nissen et al. ............ 264/53 |
| 4,525,491 A | 6/1985 | Narisawa et al. ............ 521/174 |
| 4,645,630 A | 2/1987 | Rasshofer et al. ............ 264/54 |
| 4,687,788 A | 8/1987 | Hillshafer et al. ............ 521/163 |
| 5,238,973 A | 8/1993 | Mayer et al. ............ 521/159 |
| 5,504,179 A | 4/1996 | Meiners et al. ............ 528/49 |
| 6,057,416 A | 5/2000 | Nodelman et al. | |
| 6,765,080 B2 | 7/2004 | Super et al. ............ 528/60 |

FOREIGN PATENT DOCUMENTS

| EP | 477697 A2 | 4/1992 |
| EP | 0748828 A1 | 12/1996 |
| WO | 00/50483 | 8/2000 |

*Primary Examiner* — John Cooney
(74) *Attorney, Agent, or Firm* — N. Denise Brown

(57) ABSTRACT

This invention relates to solid elastomers which exhibit reduced dimensional shrinkage, and to a process for the production of these elastomers. These elastomers comprise the reaction product of a polyisocyanate component or prepolymer, with an isocyanate-reactive component comprising a high molecular weight component having an EO cap having less than 17% by wt., a chain extender and optionally, a crosslinker, in the presence of at least one catalysts. These solid elastomers are produced via the reaction injection molding process in a closed mold, preferably at an isocyanate index of about 70 to about 130.

8 Claims, No Drawings

SOLID POLYURETHANE ELASTOMERS WHICH EXHIBIT REDUCED DIMENSIONAL SHRINKAGE

BACKGROUND OF THE INVENTION

This invention relates to solid polyurethane elastomers which exhibit reduced shrink and to a process for the production of these elastomers. These elastomers comprise the reaction product of a polyisocyanate component or prepolymer, with an isocyanate-reactive component comprising a high molecular weight component having an EO cap of less than about 17% by wt., a chain extender and optionally, a crosslinker, in the presence of at least one catalysts. These solid elastomers are produced via the reaction injection molding process in a closed mold, at an isocyanate index of about 70 to about 130.

The production of polyurethane moldings via the reaction injection molding (i.e. RIM) technique is well known and described in, for example, U.S. Pat. No. 4,218,543. The RIM process involves a technique of filling the mold by which highly reactive, liquid starting components are injected into the mold within a very short time by means of a high output, high pressure dosing apparatus after they have been mixed in so-called "positively controlled mixing heads".

In the production of polyurethane moldings via the RIM process, the reaction mixture generally comprises an A-side based on polyisocyanates and a B-side based on organic compounds containing isocyanate-reactive hydrogen atoms, in addition to suitable chain extenders, catalysts, blowing agents, and other additives. The polyisocyanates which are typically used in a commercial RIM process are the aromatic isocyanates such as, for example, diphenyl methane-4,4'-diisocyanate (i.e. MDI).

A RIM process and polyurethane integral skin foams produced by that process are disclosed in U.S. Pat. No. 4,243,760. These integral skin foams comprise the reaction product of an aromatic isocyanate, a high molecular weight polyether triol, and a chain extender. The high molecular weight polyether is characterized as having an internal mixed propylene oxide/ethylene oxide segment and a sufficient EO cap to result in a primary hydroxyl group content of >50%, and usually >90%. These integral skin foams have a compact skin or surface and a cellular foam core, and require a blowing agent.

RIM elastomers that are dimensionally stable at high temperatures and a process for their production are described in U.S. Pat. No. 4,297,444. These comprise the reaction product of a polyether polyol, a relatively low molecular weight compound containing at least two active hydrogen groups, and a polyisocyanate. The polyisocyanate and at least about 30% of the polyether polyol are pre-reacted to form a prepolymer, and the balance of polyether polyol (if any) is mixed with the low molecular weight compound, which is then added to the prepolymer and reacted. The polyisocyanate component may be a blend of a prepolymer and a polyisocyanate. It is also disclosed in the '444 patent that shrinkage factors are similar after 250° F. postcure and 325° F. postcure when more polyol is introduced on the A-side in the form of a quasi-prepolymer.

U.S. Pat. No. 4,440,705 describes a process for preparing cellular and non-cellular polyurethane elastomers, preferably by a RIM process. The process comprises reacting an organic isocyanate, with a polyether polyol, chain extender and/or crosslinking agent in the presence of catalysts, blowing agents, and various additives. The polyether polyols have terminal hydroxyethylene groups with ethoxylation degrees of 1 to 12, preferably 2 to 8, and a high content of primary hydroxyl groups. All of the examples are cellular elastomers prepared with a blowing agent (dichlorodifluoromethane). The resultant integral skin foams exhibited shorter demold times, and good dimensional stability (i.e. no shrinking or swelling), along with good elongation and bending stability.

U.S. Pat. No. 5,238,973 discloses a process for preparing elastic moldings which are optionally cellular by the RIM process in a closed mold. This process comprises reacting a prepolymer which comprises the reaction product of an MDI-based isocyanate component with a polyether polyol (MW=1000 to 6000 and OH functionality of no more than 2.4), at an equivalent ratio of at least 3.2:1 to form a semi-prepolymer, and reacting the prepolymer via the RIM process with B) which consists essentially of up to 10% of the polyol b) and c) an aromatic diamine having an alkyl substituent in at least one ortho-position to the amino groups, and optionally d) low molecular weight aliphatic polyols or aliphatic aminopolyethers. At least 90% by weight of the high molecular weight polyol is used to make the prepolymer in the first step.

A RIM process comprising reacting a NCO-terminated prepolymer and one or more NCO-reactive components which contain inorganic fillers is disclosed in U.S. Pat. No. 5,504,179. A compound which contains an acidic group is typically included in the NCO-reactive component. Suitable prepolymers include those of any isocyanate with a polyol having a MW of 1500 to 12,000 and OH functionality of at least 2. Suitable isocyanate-reactive components comprise (1) aromatic diamines having at least one alkyl substituent in a position ortho to the amino groups (e.g. DETDA) and (2) aliphatic reactive components having OH or NH functionalities of 2 to 6 and MWs of 230 to 12,000, and being a polyether or polyester which contains OH and/or primary NH groups in an amount of from 5 to 20 equivalent %. It is disclosed that surprisingly the invention shows the effect of a reduced shrinkage due to the acidic component. The shrinkage with the acidic component in the present invention is essentially the same as seen in a single step process. The use of fillers in these elastomers is also known to reduce shrinkage.

High performance RIM polyurethane(urea) elastomers are described in U.S. Pat. No. 6,765,080. These comprise the reaction product of (A) an allophanate-modified diphenylmethane diisocyanate prepolymer having an NCO group content of 5 to 20%, and (B) an isocyanate-reactive component comprising (1) a high molecular weight ATPE having a functionality of 2 to 5, (2) an aromatic diamine chain extender having a molecular weight of 100 to 500, (3) optionally, chain extenders and/or crosslinkers having a molecular weight of 200 to 600, a functionality of 1.5 to 6, and are either aliphatic amine terminated polyether polyols or aliphatic hydroxyl terminated polyether polyols.

Advantages of the present invention include the ability to control and/or reduce shrinkage of solid polyurethane elastomers without the addition or inclusion of a special additive such as inorganic fillers as in U.S. Pat. No. 5,238,973 and/or acidic additives as described in U.S. Pat. No. 5,504,179.

SUMMARY OF THE INVENTION

This invention relates to solid polyurethane elastomers which exhibit reduced dimensional shrinkage and to a process for the production of these solid polyurethane elastomers. These solid elastomers are prepared via the reaction injection molding process in a closed mold at an Isocyanate Index of about 70 to about 130. These elastomers comprise the reaction product of:

(A) at least one polyisocyanate component having an isocyanate functionality of from about 2 to about 2.5, or a prepolymer thereof, in which the prepolymer comprises the reaction product of the polyisocyanate with an isocyanate-reactive component having a molecular weight of less than 1,000, preferably less than 500 and most preferably less than 300, and a hydroxyl functionality of about 2 to about 4, preferably about 2 to about 3 and most preferably about 2.2;
with
(B) an isocyanate-reactive component comprising:
  (1) from about 75% to about 90% by weight, based one 100% of the combined weight of (B)(1), (B)(2) and (B)(3), of one or more isocyanate-reactive component having a functionality of from about 2 to about 3, an OH number of from about 28 to about 35, a molecular weight of from about 4000 to about 6000, and containing less than 17% (preferably less than 15%, more preferably no more than 13% and preferably at least about 1% and more preferably at least about 2%) by weight of ethylene oxide as an external cap;
  (2) from about 4% to about 25%, based on 100% of the combined weight of (B)(1), (B)(2) and (B)(3), of a chain extender having a hydroxyl functionality of about 2 and a molecular weight of from about 60 to less than about 250;
  and
  (3) from 0% to about 6%, based on 100% of the combined weight of (B)(1), (B)(2) and (B)(3), of an isocyanate-reactive component selected from the group consisting of
    (a) at least one isocyanate-reactive compound having a hydroxyl functionality of from about 3 to about 4, an OH number of from about 400 to about 850, a molecular weight of from about 200 to about 400,
    and
    (b) at least one organic amine compound having a functionality of 2 to 4, and a molecular weight of from about 60 to about 400;
in the presence of:
(C) one or more catalyst.

The process of producing these solid polyurethane elastomers comprises:
(I) reacting:
  (A) at least one polyisocyanate component having an isocyanate functionality of from about 2 to about 2.5, or a prepolymer thereof, in which the prepolymer comprises the reaction product of the polyisocyanate with an isocyanate-reactive component having a molecular weight of less than 1,000, preferably less than 500 and most preferably less than 300, and a hydroxyl functionality of about 2 to about 4, preferably about 2 to about 3 and most preferably about 2.2;
  with
  (B) an isocyanate-reactive component comprising:
    (1) from about 75% to about 90% by weight, based one 100% of the combined weight of (B)(1), (B)(2) and (B)(3), of one or more isocyanate-reactive component having a functionality of from about 2 to about 3, an OH number of from about 28 to about 35, a molecular weight of from about 4000 to about 6000, and containing less than 17% (preferably less than 15%, more preferably no more than 13%, and preferably at least 1% and more preferably at least 2%) by weight of ethylene oxide as an external cap;
    (2) from about 4% to about 25%, based on 100% of the combined weight of (B)(1), (B)(2) and (B)(3), of a chain extender having a hydroxyl functionality of about 2 and a molecular weight of from about 60 to less than about 250;
    and
    (3) from 0% to about 6%, based on 100% of the combined weight of (B)(1), (B)(2) and (B)(3), of an isocyanate-reactive component selected from the group consisting of
      (a) at least one isocyanate-reactive compound having a hydroxyl functionality of from about 3 to about 4, an OH number of from about 400 to about 850, and a molecular weight of from about 200 to about 400,
      and
      (b) at least one organic amine compound having a functionality of 2 to 4, and a molecular weight of from about 60 to about 400;
  in the presence of:
  (C) one or more catalyst.

DETAILED DESCRIPTION OF THE INVENTION

Suitable polyisocyanates which can be used as component (A) in the present invention include those commonly used for the production of polyurethane systems such as diphenylmethane-4,4'- and/or -2,4'- and/or -2,2'-diisocyanate (MDI); and the technical polyphenyl-polymethylene polyisocyanates obtained by phosgenating aniline-formaldehyde condensates and described, for example, in British Patent No. 874,430, and 848,671 (MDI containing polynuclear polyisocyanates). The modified polyisocyanates obtained by the modification of MDI, for example, polyisocyanates modified with polyols through urethane groups, carbodiimide polyisocyanates, isocyanurate polyisocyanates, biuretized polyisocyanates, allophanatized polyisocyanates or uretdione polyisocyanates are examples of suitable modified technical isocyanates.

Allophanate-modified polyisocyanates which are suitable for the present invention include, for example, those which are known and described in, for example, U.S. Pat. Nos. 4,810,820, 5,124,427, 5,208,334, 5,235,018, 5,444,146, 5,614,605, 5,663,272, 5,783,652, 5,789,519, 5,859,163, 6,028,158, 6,063,891, the disclosures of which are herein incorporated by reference.

In an alternate embodiment of the invention, the polyisocyanate component comprises an NCO-terminated of a polyisocyanate. Suitable NCO-terminated prepolymers comprise the reaction product of a polyisocyanate as described above with an isocyanate-reactive compound. Suitable isocyanate-reactive compound are those having a molecular weight of less than 1,000 or so, preferably less than about 500 and more preferably less than about 300, and having a hydroxyl functionality of about 2 to about 4. Preferably, these prepolymers are formed by reacting MDI/PMDI with an isocyanate-reactive component in quantities such that the NCO content is from about 10 to 30%, preferably from about 15 to 30%, and most preferably from about 20 to 30%.

The isocyanate-reactive component (B) of the present invention comprises
(1) from 75 to 90%, preferably from 80 to 90% and most preferably from 80 to 85% by weight, based on 100% of the combined weight of (B)(1), (B) (2) and (B)(3), of one or more isocyanate-reactive components having a functionality of from about 2 to about 3, an OH number of from about 28 to about 35, a molecular weight of from about 4,000 to about 6,000 and containing less than 17%, preferably less than 15%, more preferably no more than 13%; and preferably at least 1%, and more preferably at least 2% by weight of ethylene oxide as an external cap;
(2) from about 4 to about 25%, preferably from about 10 to about 20% and most preferably from about 10 to 15% by weight, based on 100% of the combined weight of (B)(1), (B)(2) and (B)(3), of at least one chain extender having a hydroxyl functionality of 2 and a molecular weight of from about 60 to less than about 250;
and
(3) from 0 to 6%, preferably from 2 to 5% and most preferably from 2 to 4% by weight, based on 100% of the combined weight of (B)(1), (B)(2) and (B)(3), of an isocyanate-reactive component selected from the group consisting of:
   (a) at least one isocyanate-reactive compound having a hydroxyl functionality of from about 3 to about 4, an OH number of from about 400 to about 850, a molecular weight of from about 200 to about 400,
   and
   (b) at least one organic amine compound having a functionality of 2 to 4, and a molecular weight of from about 60 to about 400.

Suitable isocyanate-reactive compounds to be used as component (B)(1) in the present invention include those compounds containing from about 2 to about 3 hydroxyl groups which are capable of reacting with the isocyanate groups of component (A), an OH number of from about 28 to about 35, a molecular weight of from about 4,000 to about 6,000, and containing less than about 17% (preferably less than 15%, more preferably no more than 13%) by weight of ethylene oxide as an external cap. The weight basis of ethylene oxide as an external cap is based on 100% by weight of alkylene oxide groups.

These relatively high molecular weight polyols include linear or branched, di-, tri-, tetra- or higher functional polyoxyalkyene polyols (polyalkylene oxide polyols) having molecular weight of from about 4,000 to about 6,000, preferably from about 4,800 to about 6,000. The polyols preferably have OH numbers of from about 28 to about 35. These polyoxyalkylene polyols may be obtained by the addition of alkyloxiranes, such as propylene oxide, ethylene oxide, epichlorohydrin, 1,2- or 2,3-butylene oxide and/or styrene oxide onto difunctional or trifunctional starters, such as water, diols, triols, Mixtures of alkyloxiranes (for examples, of propylene oxide and epichlorohydrin) may also be used for producing the polyoxyalkylene polyols.

Suitable isocyanate-reactive components to be used as component (B)(1) in accordance with the present invention include, for example those which contain less than 17% by weight of ethylene oxide as an external cap, and preferably less than 15% by weight of ethylene oxide as an external cap. The compounds to be used as the isocyanate-reactive component (B)(1) typically have an external cap of ethylene oxide of less than 17% by weight, preferably less than 15% by weight, and more preferably of no more than 13% by weight. These compounds also typically have an external cap of ethylene oxide preferably of at least about 1% by weight and more preferably of at least about 2% by weight. These compounds may have an external cap of ethylene oxide ranging between any combination of these upper and lower values, inclusive. The weight of ethylene oxide as an external cap is based on the sum or all the oxyalkylene units present in the isocyanate-reactive component (B)(1). The remaining oxyalkylene radicals are preferably oxypropylene radicals.

These isocyanate-reactive components typically have a hydroxyl functionality of from about 2 to about 3. Technically, the most important isocyanate-reactive components are the polyoxypropylene polyols which contain less than 17% by weight, preferably from 1% to less than 15% by weight, and more preferably from 2% to no more than about 13% by weight of ethylene oxide as an external cap.

The polyalkylene polyether polyols can also be used in the form of mixtures.

In the preferred polyether polyols described above, the oxyethylene content should be such that at room temperature the polyether polyol is liquid or the non-oxyethylene content in the polyether polyol should be selected so that a liquid is obtained.

The isocyanate-reactive components suitable for (B)(1) of the present invention may be produced in known manner by the polymerization of alkyloxiranes or mixtures thereof or by their addition onto starter components containing reactive hydrogen (such as water, ethylene glycol, 1,2- or 1,3-propane diol, dipropylene glycol, 1,4- or 3,6-dianhydro-sorbitol, trimethylol propane, glycerol, pentaerythritol, sorbitol, 4,4'-dihydroxydiphenyl propane, optionally, in the presence of acidic or, preferably basic catalysts. The polymerization process is optionally carried out in a mixture with ethylene oxide, but preferably in stages with addition of the ethylene oxide in the final stage being preferred, or in stepwise reactions, in a manner such that the above-described polyols are formed.

Production, properties and specific examples of polyethers of this type are described in Ullmanns Enzyklopadie der Technischen Chemie, Verlag Chemie, Weihheim 4$^{th}$ Edition, Vol. 19 (1981), in the chapter on polyalkylene glycols (pages 31 to 38) and in the chapter on polyurethanes (pages 301 to 341, more particularly pages 304 to 308). They are also discussed in Kunststoff-Handbuch, Vol. VII, Polyurethane, Carl Hanser Verlag, Munich, 1$^{st}$ Edition (1966), pages 61 to 75 and 2$^{nd}$ Edition (1983) pages 42 to 54 and pages 75 to 77.

Suitable compounds to be used as component (B)(2) of the present invention include those chain extenders having about 2 hydroxyl groups and having a molecular weight in the range of from about 60 to less than about 250.

Examples of suitable low molecular weight chain extenders include, for example, diols or mixtures of diols, preferably straight-chain or branched-chain (cyclo)alkylene diols, such as ethylene glycol, 1,2-propane diol, 1,3-propane diol, 3-chloro-2-propane diol, 2-methyl-1,3-propanediol, 1,3-butanediol, 1,4-butanediol, 2,3-butanediol, 1,6-hexanediol, 1,10-decanediol, diethylene glycol, triethylene glycol, dipropylene glycol, tripropylene glycol, neopentyl glycol, 2-butene-,4-diol, 2,2,4-trimethyl-pentane-1,3-diol, 1,4-dihydroxy cyclohexane, 1,4-dihydroxy methyl cyclohexane, cyclohexane dimethanol, etc. Preferred chain extenders are, for example, ethylene glycol, diethylene glycol, dipropylene glycol, triethylene glycol, tripropylene glycol, 1,4-butane diol and mixtures thereof.

Suitable isocyanate-reactive components to be used as (B) (3) when present in accordance with the invention, include those isocyanate-reactive components selected from the group consisting of:
(a) at least one isocyanate-reactive compound having a hydroxyl functionality of from about 3 to about 4, an OH number of from about 400 to about 850, and a number average molecular weight of from about 200 to about 400, and
(b) at least one organic amine compound having a functionality of 2 to 4, and a molecular weight of from about 60 to about 400.

There are generally two main groups of compounds suitable for component (B)(3). These include compounds described as component (B)(3)(a) which have hydroxyl functionality, and compounds described as component (B)(3)(b) which have amine functionality, and optionally hydroxyl functionality.

Component (B)(3)(a) includes isocyanate-reactive compounds having a hydroxyl functionality of from about 3 to about 4, an OH number of from about 400 to about 850 and a number average molecular weight of from about 200 to about 400. Suitable compounds to be used as (B)(3)(a) include, for example, the reaction product of a compound containing at least two amine groups with an alkylene oxide such as, for example, propylene oxide and/or ethylene oxide, as well as compounds such as isocyanate-reactive tertiary amine polyethers.

Among the suitable compounds to be used as isocyanate-reactive tertiary amine polyethers, i.e. component (B)(3)(a) of the present invention, include compounds having the formula:

$$R[NR^1R^2]_m$$

wherein:
  R: represents a saturated or unsaturated $C_2$-$C_8$ aliphatic or $C_2$-$C_8$ aliphatic substituted with —OH, —SH, or —NHR$^a$ wherein R$^a$ is a $C_1$-$C_8$ alkyl or $C_2$-$C_8$ alkenyl; saturated or unsaturated $C_5$-$C_8$ cycloaliphatic or $C_5$-$C_8$ cycloaliphatic substituted with $C_1$-$C_8$ alkyl, $C_2$-$C_8$ alkenyl, $C_1$-$C_8$ alkylene, —OH, —SH or —NHR$^a$ wherein R$^a$ is $C_1$-$C_8$ alkyl or $C_2$-$C_8$ alkenyl; or five- or six-membered aromatic or heteroaromatic optionally substituted with $C_1$-$C_8$ alkyl, $C_1$-$C_8$ alkoxy, halogen, cyano, nitro, $C_1$-$C_8$ alkylene, —OH, —SH, or —NHR$^a$ wherein R$^a$ is $C_1$-$C_8$ alkyl or $C_2$-$C_8$ alkenyl;
  $R_1$ and $R_2$: each independently represent polyether groups terminated with isocyanate-reactive groups selected from —OH, —SH and —NHR$^b$ wherein R$^b$ is a $C_1$-$C_8$ alkyl or $C_2$-$C_8$ alkenyl;
  and
  m: represents an integer of from 1 to 4.

The term "saturated or unsaturated $C_2$-$C_8$ aliphatic" as applied to group R of component (B)(3)(a) refers to straight or branched chain hydrocarbon groups having from 2 to 8 carbon atoms attached to form 1 to 4 —NR$^1$R$^2$ groups (preferably such that no carbon atoms is attached to two nitrogen atoms) and optionally containing carbon-carbon double bonds (with the proviso that no double-bonded carbon atom is attached directly to a nitrogen atom). For example, when m is 2, saturated or unsaturated $C_2$-$C_8$ aliphatic groups include linear ethylene, propylene, butylene, pentylene, hexylene, heptylene, and octylene groups, as well as the isomeric branched forms thereof. The term "saturated or unsaturated $C_5$-$C_8$ cycloaliphatic" as applied to group R of component (B)(3)(a) refers to cyclopentane, cyclohexane, cycloheptane, and cyclooctane groups, as well as to $C_1$-$C_8$ alkyl derivatives thereof, that are attached to the —NR$^1$R$^2$ groups either directly to the ring carbon atoms or indirectly through the optional $C_1$-$C_8$ alkylene substituents (preferably such that no carbon atom is attached directly to two nitrogen atoms) and that optionally contain carbon-carbon double bonds in the cyclic moiety (preferably such that no double-bonded carbon atom is attached directly to a nitrogen atom). For example, when m is 2, preferred saturated or unsaturated $C_5$-$C_8$ cycloaliphatic groups include the various isomeric cyclopentylene, cyclohexylene, cycloheptylene, and cyclooctylene groups. Suitable but less preferred saturated or unsaturated $C_5$-$C_8$ cycloaliphatic groups include those in which at least one ring carbon atom is attached to the —NR$^1$R$^2$ groups indirectly through an optional $C_1$-$C_8$ alkylene substituent, such as groups in which m is 2 having the formulas:

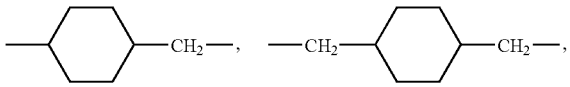

and the like. The term "five- or six-membered aromatic or heteroaromatic" as applied to group R of component (B)(2)(a) refers to benzene, six-membered heterocyclic groups containing at least one ring nitrogen atom (such as pyridine, pyrazine, pyrimidine, pyridazine, and the like), five-membered heterocyclic groups containing at least one ring nitrogen, oxygen, or sulfur atom (such as, furan, pyrrole, imidazole, pyrazole, thiophene, oxazole, isoxazole, thiazole, isothiazole, and the like), each of which can be substituted with $C_1$-$C_8$ alkyl, $C_1$-$C_8$ alkoxy, halogen, cyano, nitro, or $C_1$-$C_8$ alkylene. When the substituent is $C_1$-$C_8$ alkylene, the aromatic or heteroaromatic group can be attached to the —NR$^1$R$^2$ groups indirectly through the alkylene substituents.

Each group R can optionally be substituted with —OH, —SH, or —NHR$^a$ groups wherein R$^a$ is $C_1$-$C_8$ alkyl or $C_2$-$C_8$ alkenyl (preferably alkenyl in which no double-bonded carbon atom is attached directly to a nitrogen atom), particularly when m is 1, to provide additional isocyanate-reactive sites. Examples of suitable such groups R when m is 1 include hydroxyethyl and hydroxypropyl. Such groups are generally not preferred when m is 2, 3 or 4.

The term "polyether groups terminated with isocyanate-reactive groups" as applied to groups $R^1$ and $R^2$ of component (B)(3)(a) refers to polyethers prepared, for example, by the general methods described above for preparing isocyanate-reactive component (B)(1), provided that one end of each polyether chain is attached to the nitrogen atom indicated in the formula and the other end is terminated by at least one —OH, —SH, or —NHR$^b$ group, and that the molecular weight of the resultant tertiary amine polyether (B)(3)(a) ranges from about 200 to about 400. Suitable polyethers include hydroxy-terminated polyoxyalkylene polyethers, such as those having polyoxyethylene, polyoxypropylene, polyoxybutylene, or polytetramethylene groups, especially hydroxy-terminated polyoxypro-pylene groups.

Particularly preferred isocyanate-reactive tertiary amine polyethers (B)(3)(a) are those in which R is a difunctional saturated $C_2$-$C_8$ aliphatic groups, $R^1$ and $R^2$ are independently hydroxy-terminated polyethers containing exclusively polypropylene oxide units, and m is 2, and in which the molecular weight is from 200 to 400.

Suitable compounds to be used as component (B)(3)(b) in the present invention include those organic amine compounds having a functionality of 2 to 4 and a molecular weight of from about 60 to about 400. Reactivities of the attenuated-reactivity amino groups can be moderated by steric effects and/or electronic effects.

Suitable organic amines for component (B)(3)(b) are selected from the group consisting of:
(1) a sterically hindered aromatic amine in which one or more aromatic ring substituents are situated ortho to the amino groups,
(2) an aromatic amine other than amine (B)(3)(b)(1) in which at least one of the amine groups exhibits reduced reactivity due primarily to electronic effects rather than steric factors,
(3) an aromatic or non-aromatic amine having secondary amine groups, (4) a non-aromatic amine having sterically hindered primary amine groups, and (5) mixtures thereof.

Suitable amines include sterically hindered aromatic amines (B)(3)(b)(1) in which one or more aromatic ring substituents (preferably $C_1$-$C_6$ alkyl groups) are situated ortho to the amino groups. It is, of course, possible for such compounds to include substituents that inhibit reactivity by electronic effects. Examples of such hindered aromatic amines include diamines such as 1-methyl-3,5-bis(methylthio)-2,4- and/or -2,6-diamino-benzene, 1,3,5-triethyl-2,4-diaminobenzene, 1,3,5-triisopropyl-2,4-di-aminobenzene, 1-methyl-3,5-diethyl-2,4- and/or 2,6-diamino-benzene (DETDA), 4,6-dimethyl-2-ethyl-1,3-diaminobenzene, 3,5,3',5'-tetraethyl-4,4'-diaminodiphenylmethane, 3,5,3',5'-tetraisopropyl-4,4'-diaminodi-phenylmethane, and 3,5-diethyl-3',5'-diisopropyl-4,4'-diaminodiphenyl-methane.

Suitable compounds (B)(3)(b) also include other aromatic amines (B)(3)(b)(2) in which reactivity is primarily determined by electronic effects rather than steric factors. It is, of course, possible for such compounds to include sterically hindered amino groups as well. Examples of suitable aromatic amines include those containing deactivating substituents (such as halogens, nitro or carbonyl groups), especially diamines such as halogenated diaminodiphenylmethanes (for example, 3,3'-dichloro-4,4'-diaminodi-phenylmethane (MOCA) and 3-chloro-4,4'-diaminodiphenyl-methane (in which the amino group attached to the chlorinated aromatic ring is left exposed)), and 4-(4'-aminobenzyl)cyclohexylamine (½ PACM).

Examples of aromatic or non-aromatic amines (B)(3)(b)(3) having secondary amino groups include N,N'-dialkyl-p-phenylenediamines, N,N'-dialkylaminodiphenylmethanes, and piperzine or sterically hindered derivatives thereof.

Examples of non-aromatic amines suitable as component (B)(3)(b)(4) having sterically hindered primary amino groups include 2-methyl-2-amino-propanol.

Suitable catalysts for the present invention include those known in the art to be capable of promoting the reaction between isocyanate groups of polyisocyanates and isocyanate-reactive groups of isocyanate-reactive compounds. Some examples of suitable catalysts include the tertiary amines, organometallic compounds, particularly organotin catalysts, such as, for example, tin carboxylates and bismuth carboxylates, tin-sulfur catalysts, etc.

In addition to the catalysts, other additives may also optionally be present in the formulations in accordance with the present invention. Such additives include, but are not limited to, cell regulators, flame retarding agents, plasticizers, dyes, pigments, external mold release agents, etc. A preferred pigment is carbon black. When present in the formulation of the invention, carbon black is typically dispersed in a small quantity of an isocyanate-reactive component such as, for example, polyether polyol.

The compositions according to the present invention may be molded using conventional processing techniques at isocyanate indexes ranging from about 70 to 130, preferably from 90 to 110. By the term "Isocyanate Index" (also commonly referred to as "NCO index"), is defined herein as the equivalents of isocyanate, divided by the total equivalents of isocyanate-reactive hydrogen containing materials, multiplied by 100. When water is present in the reaction systems of the present invention, the quantity of water present is not considered in calculating the isocyanate index.

As used herein, the term "molecular weight" refers to the number average molecular weight as determined by end-group analysis. Also, as used herein, the term "number average functionality" refers to the functionality of a blend of polyisocyanates or polyols of different functionalities, averaged over the total weight of the blend.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples:

Polyisocyanate A: an isocyanate prepolymer having an NCO group content of about 23%, a viscosity of between about 500 and 800 mPa·s at 25° C., and comprising the reaction product of about 86.5% by weight of 4,4'-diphenylmethane diisocyanate having an NCO group content of about 33.6% and a functionality of about 2 and about 13.5% by weight of tripropylene glycol Polyol A: a glycerin initiated polyether polyol having an internal propylene oxide block content of about 83% and an external ethylene oxide cap of about 17%, characterized by an OH number of about 28 and a functionality of about 3

Polyol B: a glycerin initiated polyether polyol having an internal propylene oxide block content of about 87% and an external ethylene oxide cap of about 13%, characterized by an OH number of about 28 and a functionality of about 3

Extender A: ethylene glycol

Extender B: 1,4-butanediol

Crosslinker A: a ethylene diamine initiated polyether polyol of propylene oxide, having an OH number of about 630 and a functionality of about 4

Surfactant A: a silicone surfactant commercially available as L 1000 from GE Silicones Catalyst A: an organo tin catalyst commercially available as Fomrez UL-38 from Air Products DR-0217: carbon black dispersed in a polyether polyol RIM Examples The four (4) formulations as shown in TABLE 1 were used to produce reaction injection molded articles. The polyurethane-forming system was injected using a Cincinnati High Pressure Cylinder machine. The isocyanate-reactive materials and various additives were put into the B-side of the machine and the appropriate quantities of the specific prepolymer were loaded into the A-side. The Cincinnati High Pressure Cylinder was equipped with a Cincinnati mixhead. The B-side was preheated to 30° C. and the A-side was preheated to 30° C. The materials were injected at an injection pressure of about 2,000 psi and an injection rate of 3500 grams/sec. The material was injected to a plaque mold of about 3 ft.×4 ft. The mold was heated to a temperature of about 49° C., 65° C. or 74° C. After 1, 2 or 3 minutes, the plaques were demolded.

TABLE 1

| | Example | | | |
|---|---|---|---|---|
| | 1 | 2 | 3 | 4 |
| Polyol A | 88 | | 82 | |
| Polyol B | | 88 | | 88 |
| Extender A | 11 | 11 | | |
| Extender B | | | 16 | 16 |
| Crosslinker A | 2 | 2 | 2 | 2 |
| Surfactant A | 1 | 1 | 1 | 1 |
| Catalyst A | 0.12 | 0.12 | 0.12 | 0.12 |
| DR-0217 | 6 | 6 | 6 | 6 |
| Isocyanate A | 81.5 | 81.5 | 81 | 81 |
| Molded Density (pcf) | 63.00 | 63.00 | 63.00 | 63.00 |
| Isocyanate Index | 105 | 105 | 105 | 105 |
| Mix Ratio (Iso:Polyol) | 75.34 | 75.34 | 75.62 | 75.62 |

It is known from experience that there are several key processing parameters which influence part shrinkage. The two main ones are the demold time and the mold temperature. In addition, flow direction of the material in the mold also shows differences, particularly in systems which contain fillers.

The four formulations above were evaluated by molding plaques of each of these formulations at 3 different mold temperatures, and 3 different demold times as shown in TABLES 2A, 2B, 2C and 2D. Part measurements were taken at least a day after molding, and the parts were measured in both directions, parallel to flow and perpendicular to flow.

TABLE 2A

Shrinkage of Example 1 at Various Mold Temperatures and Demold Times

| | Temp (° C.) | | | | | | | | |
|---|---|---|---|---|---|---|---|---|---|
| | 74 | 74 | 74 | 65 | 65 | 65 | 49 | 49 | 49 |
| Mold Time (mins) | 3.0 | 2.0 | 1.0 | 3.0 | 2.0 | 1.0 | 3.0 | 2.0 | 1.0 |
| Shrinkage perpendicular | 1.48 | 1.55 | 1.62 | 1.46 | 1.54 | 1.58 | 1.22 | 1.24 | 1.35 |
| Shrinkage parallel | 1.51 | 1.59 | 1.65 | 1.43 | 1.5 | 1.55 | 1.24 | 1.28 | 1.38 |

TABLE 2B

Shrinkage of Example 2 at Various Mold Temperatures and Demold Times

| | Temp (° C.) | | | | | | | | |
|---|---|---|---|---|---|---|---|---|---|
| | 74 | 74 | 74 | 65 | 65 | 65 | 49 | 49 | 49 |
| Mold Time (mins) | 3.0 | 2.0 | 1.0 | 3.0 | 2.0 | 1.0 | 3.0 | 2.0 | 1.0 |
| Shrinkage perpendicular | 1.35 | 1.43 | 1.52 | 1.26 | 1.22 | 1.39 | 1.10 | 1.15 | 1.23 |
| Shrinkage parallel | 1.36 | 1.45 | 1.55 | 1.34 | 1.31 | 1.49 | 1.15 | 1.19 | 1.28 |

TABLE 2C

Shrinkage of Example 3 at Various Mold Temperatures and Demold Times

| | Temp (° C.) | | | | | | | | |
|---|---|---|---|---|---|---|---|---|---|
| | 74 | 74 | 74 | 65 | 65 | 65 | 49 | 49 | 49 |
| Mold Time (mins) | 3.0 | 2.0 | 1.0 | 3.0 | 2.0 | 1.0 | 3.0 | 2.0 | 1.0 |
| Shrinkage perpendicular | 1.56 | 1.65 | 1.80 | 1.51 | 1.50 | 1.60 | 1.31 | 1.37 | 1.43 |
| Shrinkage parallel | 1.51 | 1.64 | 1.77 | 1.55 | 1.53 | 1.69 | 1.27 | 1.35 | 1.40 |

TABLE 2D

Shrinkage of Example 4 at Various Mold Temperatures and Demold Times

| | Temp (° C.) | | | | | | | | |
|---|---|---|---|---|---|---|---|---|---|
| | 74 | 74 | 74 | 65 | 65 | 65 | 49 | 49 | 49 |
| Mold Time (mins) | 3.0 | 2.0 | 1.0 | 3.0 | 2.0 | 1.0 | 3.0 | 2.0 | 1.0 |
| Shrinkage perpendicular | 1.40 | 1.47 | 1.56 | 1.29 | 1.35 | 1.44 | 1.09 | 1.16 | 1.22 |
| Shrinkage parallel | 1.44 | 1.53 | 1.64 | 1.35 | 1.41 | 1.52 | 1.12 | 1.19 | 1.25 |

The above data shows shrinkage as % parallel and % perpendicular to flow at mold temperatures of about 74, about 65 and about 49° C. Demold times of 3, 2, and 1 minute (at each of the above mold temperatures) were also examined. The trend was very consistent, and it surprisingly illustrated that substituting butanediol for ethylene glycol did not result in lower shrinkage. It was, however, found that with either butanediol and ethylene glycol, less shrinkage resulted when using a high molecular weight polyether polyol which had a smaller quantity of EO as an external cap, regardless of the mold temperature, demold time and/or flow direction used.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A low-shrinkage solid polyurethane elastomer comprising the reaction product of:
    (A) at least one polyisocyanate component selected from the group consisting of (1) polyisocyanates having an isocyanate functionality of from about 2 to about 2.5, and (2) prepolymers of polyisocyanates which comprise the reaction product of a polyisocyanate having an isocyanate functionality of from about 2 to about 2.5 with an isocyanate-reactive component having a molecular weight of less than 1,000 and a hydroxyl functionality of about 2 to about 4;
    with
    (B) an isocyanate-reactive component comprising:
        (1) from about 80% to about 90% by weight, based on 100% of the combined weight of (B)(1), (B)(2) and (B)(3), of at least one isocyanate-reactive component having a functionality of from about 2 to about 3, an OH number of from about 28 to about 35, a molecular weight of from about 4000 to about 6000, and containing less than 15% by weight, based on 100% by weight of alkylene oxide groups present in (B)(1), of ethylene oxide all of which is present as an external cap, and in which the balance of alkylene oxide groups present in (B)(1) is propylene oxide groups;
        (2) from about 10% to about 20% by weight, based on 100% of the combined weight of (B)(1), (B)(2) and (B)(3), of a chain extender having a hydroxyl functionality of about 2 and a molecular weight of from about 60 to less than about 250, said chain extender being selected from the group consisting of ethylene glycol, 1,4-butanediol, diethylene glycol, dipropylene glycol, triethylene glycol, tripropylene glycol and mixtures thereof;
    and
        (3) from 2% to 5% by weight, based on 100% of the combined weight of (B)(1), (B)(2) and (B)(3), of an isocyanate-reactive component having a hydroxyl functionality of from about 3 to about 4, an OH number of from about 400 to about 850, a molecular weight of from about 200 to about 400, and which comprises the reaction product of a compound containing at least two amine groups with an alkylene oxide;
    in the presence of:
    (C) one or more catalysts
    wherein components (A) and (B) are reacted in a closed mold via the reaction injection molding process at an Isocyanate Index from about 70 to about 130.

2. The polyurethane elastomer of claim 1, wherein (A) said polyisocyanate component comprises an isocyanate-prepolymer which comprises the reaction product of diphenylmethane diisocyanate with an isocyanate-reactive component having a molecular weight of less than 500 and having a hydroxyl functionality of about 2 to about 3.

3. The polyurethane elastomer of claim 1, wherein (B)(2) is selected from the group consisting of ethylene glycol, 1,4-butanediol and mixtures thereof.

4. The polyurethane elastomer of claim 1, wherein (B)(3) comprises an ethylene diamine initiated polyether polyol of propylene oxide.

5. The polyurethane elastomer of claim 1, wherein (B)(1) has from 2% to no more than about 13% by weight of ethylene oxide as an external cap.

6. The polyurethane elastomer of claim 1, wherein (C) said one or more catalysts are selected from the group consisting of tertiary amine catalysts, organometallic compounds and mixtures thereof.

7. The polyurethane elastomer of claim 1, which additionally comprises carbon black as a pigment.

8. The polyurethane elastomer of claim 1, in which inorganic fillers and acidic additives are absent.

* * * * *